United States Patent
Gannon

(10) Patent No.: US 7,158,136 B2
(45) Date of Patent: Jan. 2, 2007

(54) METHODS AND APPARATUS FOR DISPLAYING MULTIPLE DATA CATEGORIES

(75) Inventor: Aaron J. Gannon, Anthem, AZ (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/288,319

(22) Filed: Nov. 4, 2002

(65) Prior Publication Data
US 2004/0085319 A1 May 6, 2004

(51) Int. Cl.
G06F 15/00 (2006.01)
G09G 5/00 (2006.01)
G06G 7/48 (2006.01)
G06T 1/20 (2006.01)
G08G 1/123 (2006.01)
G01C 21/00 (2006.01)
G06T 1/00 (2006.01)

(52) U.S. Cl. .............. 345/440; 345/443; 345/630; 345/501; 340/990; 701/200

(58) Field of Classification Search ............... 345/418, 345/589, 591, 501, 440–443, 630; 348/564, 348/563; 715/805, 855; 701/3, 14, 11, 200; 340/945, 973, 972, 985, 990
See application file for complete search history.

(56) References Cited

U.S. PATENT DOCUMENTS

| | | | |
|---|---|---|---|
| 5,140,532 A * | 8/1992 | Beckwith et al. ............ 358/1.1 |
| 5,406,389 A * | 4/1995 | Hasegawa et al. .......... 358/452 |
| 5,767,854 A | 6/1998 | Anwar | |
| 6,047,233 A * | 4/2000 | Salvatore et al. ........... 701/120 |
| 6,092,076 A | 7/2000 | McDonough et al. | |
| 6,256,595 B1 * | 7/2001 | Schwalb et al. .............. 703/1 |
| 6,266,063 B1 * | 7/2001 | Baron et al. ................ 345/419 |
| 6,268,868 B1 * | 7/2001 | Yamaguchi et al. ........ 345/619 |
| 6,384,830 B1 * | 5/2002 | Baron et al. ................ 345/473 |
| 6,404,925 B1 * | 6/2002 | Foote et al. ................ 382/224 |
| 6,515,677 B1 * | 2/2003 | Lee et al. .................... 345/634 |
| 2001/0014185 A1 | 8/2001 | Chitradon et al. | |
| 2001/0047229 A1 * | 11/2001 | Staggs ........................... 701/3 |
| 2002/0080145 A1 * | 6/2002 | Ishihara ..................... 345/589 |
| 2002/0194591 A1 * | 12/2002 | Gargi .......................... 725/32 |
| 2003/0060940 A1 * | 3/2003 | Humbard et al. ............. 701/3 |
| 2003/0193411 A1 * | 10/2003 | Price .......................... 340/973 |

OTHER PUBLICATIONS

"ARC/INFO: An Example of a Contemporary Geographic Information System," Introductory Readings in Geographic Information Systems, XX, XX, 1995, pp. 90-99.

* cited by examiner

Primary Examiner—Wesner Sajous
(74) Attorney, Agent, or Firm—Ingrassia Fisher & Lorenz

(57) ABSTRACT

Methods and apparatus are provided for displaying data categories. The apparatus comprises a display that is configured to produce a first visual presentation of a first data category of the data categories and a second visual presentation of a second data category of the data categories. The apparatus also comprises a processor that is configured to control the display during simultaneous production of the first visual presentation and the second visual presentation. The processor is configured to control the display such that the first visual presentation comprises a first line bordering at least a portion of a first object of the first data category.

19 Claims, 5 Drawing Sheets

US 7,158,136 B2

METHODS AND APPARATUS FOR DISPLAYING MULTIPLE DATA CATEGORIES

FIELD OF THE INVENTION

The present invention generally relates to displaying multiple data categories, and more particularly to methods and apparatus for displaying multiple data categories.

BACKGROUND OF THE INVENTION

A display provides a visual presentation of information. This visual presentation of information with a display can include multiple data categories. For example, multiple data categories corresponding to sensors and systems of a vehicle can be visually presented to a vehicle operator with a display. The multiple data categories can be any number of classes or divisions in a classification scheme of information that are to be visually represented on a display, such as navigation data (e.g., navigation aid or NAVAID data, airport data, fix data, lateral/vertical/time flight plan route data, communication frequency data, latitude and longitude data, Grid Minimum Off-Route Altitude (Grid MORA) data, air traffic control and boundary data, magnetic variation data, time zone data, approach and departure chart data, airport diagram data, city data, road data, railroad data, elevation contour line data, river data, lake data, uplink weather data, winds aloft data, airspace data, airway data and absolute terrain data, or the like) and sensor data (e.g., airborne weather data, Automatic Dependent Surveillance—Broadcast (ADS-B) data, obstacle data, traffic sensor data or Traffic alert and Collision Avoidance System (TCAS), relative terrain data and Enhanced Ground Proximity Warning System (EGPWS) data).

Displays have continued to advance in sophistication and have achieved increasingly higher levels of information density that enable the visual presentation of a greater number of data categories, which is also referred to as data fusion. These advancements provide the visual display of multiple data categories that can be readily assimilated by an operator and/or user of the display and can also provide a reduction in unnecessary information to ease the task of perceiving and understanding a data category of interest. However, as the information density continues to increase, methods and apparatus are desirable that visually display the data categories in a manner that provides proper cognitive mapping between the operator and/or user of a display and also reduces the effort of the operator and/or user in assimilating one or more of the data categories of interest.

In view of the foregoing, it should be appreciated that it would be desirable to provide an apparatus for displaying multiple data categories. In addition, it should be appreciated that it would be desirable to provide a method for displaying multiple data categories. Furthermore, additional desirable features will become apparent to one skilled in the art from the drawings, foregoing background of the invention, and following detailed description of the invention.

BRIEF SUMMARY OF THE INVENTION

An apparatus is provided for displaying data categories. The apparatus comprises a display that is configured to produce a first visual presentation of a first data category of the data categories and a second visual presentation of a second data category of the data categories. The apparatus also comprises a processor that is configured to control the display during simultaneous production of the first visual presentation and the second visual presentation. The processor is configured to control the display such that the first visual presentation comprises a first line bordering at least a portion of a first object of the first data category.

In addition to the apparatus for displaying data categories, a method is provided for displaying data categories. The method comprises generating a first visual presentation of a first data category of the data categories and simultaneously generating a second visual presentation of a second data category of the data categories with the first visual presentation of the first data category. Furthermore, the method comprises designating a first object of said first data category with a first line that borders at least a portion of the first object.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

Figure 1:
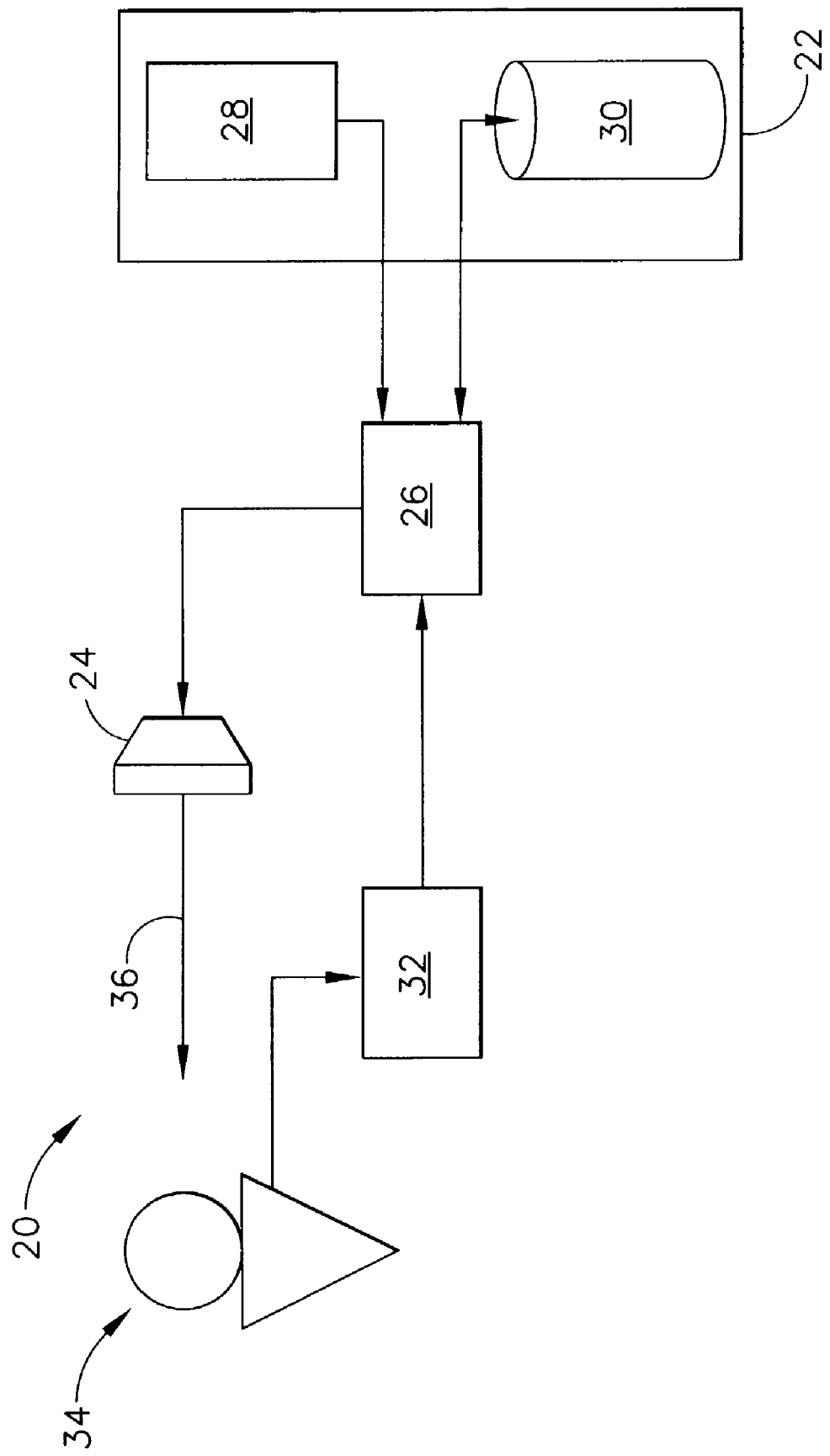
FIG. 1 is a an apparatus for displaying data categories according to an exemplary embodiment of the present invention.

Referring to FIG. 1, an apparatus 20 is illustrated for displaying data categories 22 according to a preferred exemplary embodiment of the present invention. The apparatus 20 comprises of a display 24 that is configured to produce visual presentations of the data categories 22. The display 24 can be any current and future display that is suitable for producing visual presentations of the data categories 22 and preferably a multi-color display. For example, the display 24 can be a color Cathode Ray Tube display (CRT), monochrome CRT display, Liquid Crystal Display (LCD), plasma display, Flat-Panel Display (FPD), electro-luminescent display, vacuum fluorescent display, Heads-Up Display (HUD), Heads-Down Display (HDD), Helmet Mounted Display (HMD), Light Emitting Diode (LED) display or the like.

In addition to the display 24, the apparatus 20 of the present invention also comprises of a processor 26 that is configured to control the display 24 during production of the visual presentations of the data categories 22. The processor 26 preferably encompasses one or more functional blocks and can include any number of individual microprocessors, memories, storage devices, interface cards, and other processor components. The processor 26 is configured to receive and/or access the data categories 22 and also communicate with an input device 32, which can be any device suitable for accepting input from a user 34, such as a cursor control device (e.g., touch-pad, joystick, mouse, trackball), for example. The user 34 (e.g., an aircraft pilot and/or navigator) preferably provides input to the processor 26 with the input device 32 and receives visual feedback 36 from the display 24 of the visual presentations of the data categories 22.

The data categories 22 can be any number of classes or divisions in a classification scheme of information. For illustrative purposes only, the data categories 22 in this detailed description of a preferred exemplary embodiment will be sensor data 28 and navigation data 30 of an aircraft (not shown). However, any number of data categories can be visually presented according to the present invention in addition to sensor data 28 and navigation data 30 of an aircraft. The sensor data 28 can be comprised of data categories such as airborne weather data, Automatic Dependent Surveillance—Broadcast (ADS-B) data, obstacle data, traffic sensor data or Traffic alert and Collision Avoidance System (TCAS), relative terrain data and Enhanced Ground Proximity Warning System (EGPWS) data, and the navigation data 30 can be comprised of data categories such as navigation aid or NAVAID data, airport data, fix data, lateral/vertical/time flight plan route data, communication frequency data, latitude and longitude data, Grid Minimum Off-Route Altitude (Grid MORA) data, air traffic control and boundary data, magnetic variation data, time zone data, approach and departure chart data, airport diagram data, city data, road data, railroad data, elevation contour line data, river data, lake data, uplink weather data, winds aloft data, airspace data, airway data and absolute terrain data, or the like. In addition, while the following detailed description of a preferred exemplary embodiment is directed to a display of an aircraft and more particularly to a navigational display or Multi-Function Display (MFD) of an aircraft, the present invention is applicable to other displays in an aircraft and displays for other land, water, and air or space vehicles. Furthermore, the present invention is also applicable in non-vehicle applications. For example, the present invention is applicable to simulators, Computer Aided Design (CAD) systems, video games, control systems of stationary objects, medical diagnostic devices, weather forecasting systems and laptop and desktop computers that utilize a display for visual presentation of data categories (i.e., data fusion).

The processor 26 is configured to control the display 24 for simultaneous production of multiple visual presentations (e.g., a first visual presentation, . . . , and Nth visual presentation, where N is greater than or equal to two (2)). The simultaneous production of multiple visual presentations in the following example shall be the simultaneous production of airborne weather data and relative terrain data. However, as previously described in this detailed description of the invention, more than two data categories can be produced on the display 24 in accordance with the present invention, and other data categories other than the airborne weather data and relative terrain data can be produced in accordance with the present invention. The production of the multiple data categories on the display 24 under the control of the processor 26 presents visual presentations of the data categories to the user 34 in a manner that preferably assists with the cognitive mapping between the display 24 and the user 34 and/or reduces the time, error and/or effort of the user 34 in assimilating at least one data category of interest.

Figure 2:
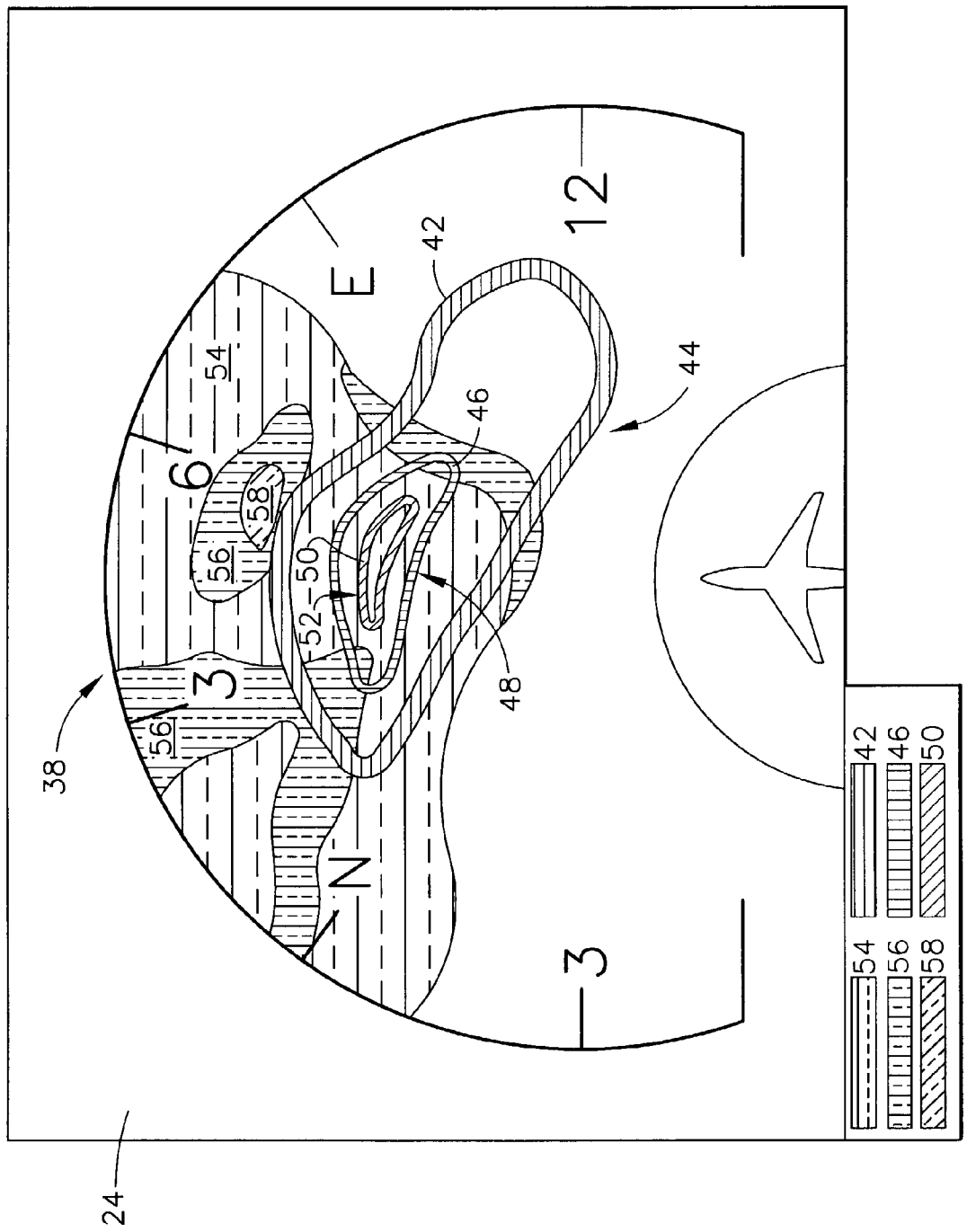
FIG. 2 is the display of FIG. 1 that is simultaneously producing multiple visual presentations of data categories under the control of the processor of FIG. 1 according to an exemplary embodiment of the invention.

Referring to FIG. 2, the display 24 is shown producing a visual presentation of airborne weather data (i.e., a first visual presentation of a first data category) and a visual presentation of relative terrain data according to one embodiment of the present invention. The visual presentations of the airborne weather data and relative terrain data is produced by the display 24 under the control of the processor 26 as shown in FIG. 1. The processor 26 can be an integrated component of the display 24, a separate and distinct unit from the display 24, or a combination of integrated component and separate and distinct unit.

The processor 26 as shown in FIG. 1 is configured to control the display 24 during simultaneous production of the visual presentations of the airborne weather data and the relative terrain data such that the presentation of the airborne weather data comprises a first line 42 bordering at least a portion of a first object 44 of the airborne weather data. In addition, the processor 26 as shown in FIG. 1 is preferably configured to control the display 24 such that the presentation of the airborne weather data comprises a second line 46 bordering at least a portion of a second object 48, and a third line 50 bordering at least a portion of a third object 52. While the first line 42, second line 46, and third line 50 border at least a portion of the first object 44, second object 48, and third object 52, respectively, the first line 42, second line 46, and/or third line 50 border a majority of the first object 44, second object 48, and third object 52, respectively, and even more preferably border substantially all of the first object 44, second object 48, and third object 52, respectively.

In this example, the first object 44 is an area of a low rate of rainfall, the second object 48 is an area of a moderate rate of rainfall, and the third object 52 is a high rate of rainfall. However, any number of objects of a data category can be bordered with at least a portion of a line, and a fewer number or greater number of lines can be used to designate a fewer number or greater number of objects in accordance with the present invention. Furthermore, as previously discussed in this detailed description of the invention, the first line 42, second line 36, third line 50, and/or any other line can be used to border at least a portion of objects for other data categories of aircraft or other vehicles, such as the relative terrain data.

The visual presentation of the objects (44,48,52) for the weather data (i.e., the first data category) is preferably limited to the lines (42,46,50), and the areas within the borders created by the lines (42,46,50) are preferably unaltered and/or un-shaded for the designation of these objects (44,48,52). In this way, the user of the display 24 can determine that each of the objects (44,48,52) exists within the area defined by the lines (42,46,50), and other data categories can be viewed with minimal interference. For example, the area between the first line 42 and the second line 46 can designate the area having a low rate of rainfall, the area between the second line 46 and the third line 50 can designate the area having a moderate rate of rainfall, and the area within the third line 50 can designate the area having a high rate of rainfall. Furthermore, the objects of other data categories, such as the relative terrain data can be seen in each of these areas within the lines (42,46,50).

In accordance with another embodiment of the present invention, the visual presentation of the relative terrain data (e.g., the second data category) produced by the display 24 under the control of the processor as shown in FIG. 1, preferably comprises a first shaded area 54 for at least a portion of a first object of the relative terrain data. In addition, the processor 26 as shown in FIG. 1 is preferably configured to control the display 24 such that the presentation of the relative terrain data comprises a second shaded area 56 for at least a portion of a second object of the relative terrain data, and a third shaded area 58 for at least a portion of a third object of the relative terrain data. While the presentation of the relative terrain data comprises the first shaded area 54, second shaded area 56, and third shaded area 58 for at least a portion of the first object, second object, and third object, respectively, the relative terrain data preferably comprises a first shaded area 54, second shaded area 56, and third shaded area for a majority of the first object, second object, and third object of the relative terrain data, respectively, and even more preferably a shaded area for substantially all or all of the first object, second object, and third object 52 of the relative terrain data, respectively.

In this example, the first object represented by the first shaded area 54 is a first altitude range with respect to the aircraft, the second object represented by the second shaded area 56 is a second altitude range with respect to the aircraft, and the third object represented by the third shaded area 58 is a third altitude range with respect to the aircraft. However, any number of objects of a data category can be represented by a shaded area, and a fewer number or greater number of shaded areas can be used to designate a fewer number or greater number of objects in accordance with the present invention. The visual presentation of the objects (54,56,58) for the relative terrain data (e.g., the second data category) provides a visual presentation on the display 24 from which the user can determine the existence of each of the objects (54,56,58), and as previously discussed in this detailed description of the invention, the lines (42,46,50) designating the objects (44,48,52) of the weather data category (e.g., the first data category) presents minimal interference with the objects (54,56,58) of the relative terrain data.

In accordance with the another embodiment of the present invention, additional characteristics are provided for the area shading and/or the line bordering in order to distinguish between objects of one data category or data objects of different between the accordance with another embodiment of the present invention. For example, each of the different shaded areas (54,56,58) can be shaded a unique color. In addition, each of the lines (42,46,50) can be presented as a unique color. The colors used for the objects of a single data category are preferably unique colors, and the colors used for the objects of multiple data categories are preferably unique colors. For example, the first line 42 can be green, the second line 46 can be yellow, and the third line 50 can be red. However, any number of colors can be used for the color of the lines (42,46,50) in accordance with the present invention. The first shaded area 54 can also be green, the second shaded area 56 can also be yellow, and the third shaded area 58 can also be red. However, any number of colors can be used for the shaded areas (54,56,58) in accordance with the present invention, including colors other than the colors used for the lines (42,46,50).

Figure 3:
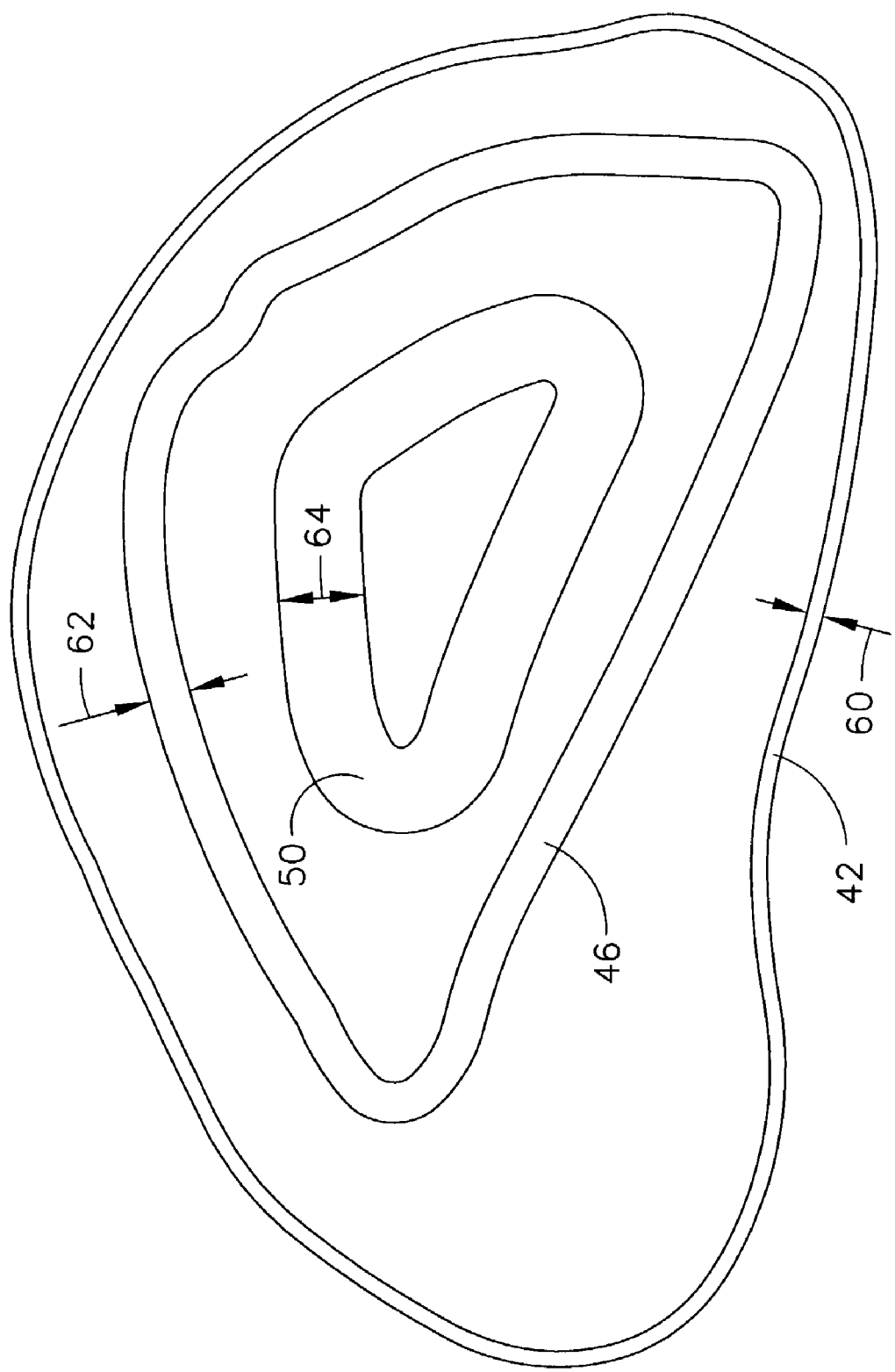
FIG. 3 is an enlarged view of lines bordering at least portions of objects as described with reference to FIG. 2 having a characteristic according to an exemplary embodiment of the present invention.

Referring to FIG. 3, another characteristic for the lines (42,46,50) is presented in order to distinguish between objects of a data category in accordance with another embodiment of the present invention. More specifically, the first line 42 is presented with a first width 60, the second line 46 is presented with a second width 62 that is preferably greater than the first width 60 of the first line 42, and the third line 50 is presented with a third width 64 that is preferably greater than the first width 60 of the first line 42 and the second width 62 of the second line 46. In this way, the user can distinguish between the objects of the data category based upon the width of the lines. Furthermore, the use of the widths (60,62,64) as a characteristic to distinguish between the objects can be used in conjunction with other characteristics, such as color as previously described in this detailed description of the invention.

Figure 4:
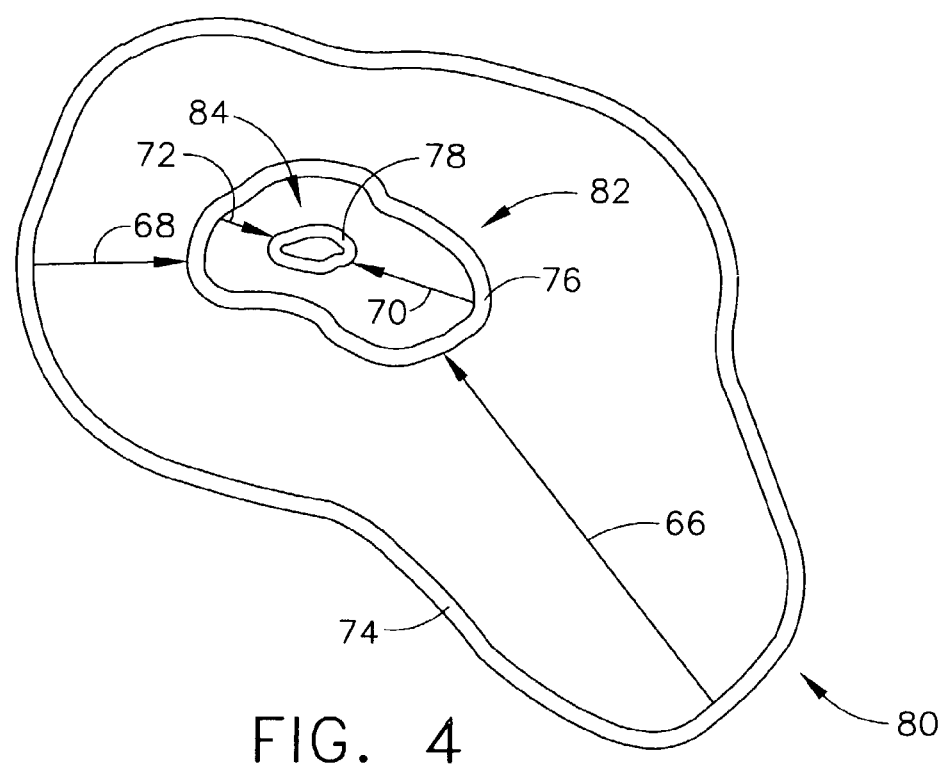
FIG. 4 is an enlarged view of lines bordering at least portions of objects as described with reference to FIG. 2 having another characteristic according to an exemplary embodiment of the present invention.

Referring to FIG. 4, at least one indicator, and preferably multiple indicators (66,68,70,72) are provided as another characteristic for the lines (74,76,78) in order to distinguish between the objects (80,82,84) and also preferably assist with a determination of the relative difference between the objects (80,82,84). In this example, the lines (74,76,78) border at least a portion of objects (80,82,84) of relative terrain data, with each of the lines (74,76,78) bordering at least a portion of an altitude range. The indicators (66,68,70,72) in this exemplary embodiment are arrows starting at one of the lines (74,76,78) bordering one of the objects (80,82,84) and ending at one of the lines (74,76,78) bordering another one of the objects (80,82,84). The indicators (66,68,70,72) formed as arrows can be configured to provide information that indicates the relative difference between the objects (80,82,84) and also provide other information. For example, indicator 66 formed as an arrow from a first line 74 to a second line 76 and a second indicator 68 formed as an arrow from the first line 74 to the second line can indicate that the relative altitude rises from the first line 74 to the second line 76. In addition, the relative difference in the length of the indicators (66,68,70,72) formed as arrows can provide a relative difference in the rate of altitude changes between different portions of one of the lines (74,76,78) and portions of another one of the lines (74,76,78). For example, a first indicator 66 formed as an arrow with a first length that is greater than a second indicator 68 formed as an arrow with a second length can indicate that rate in which the altitude rises between the first line 74 and the second line 76 is greater at the location of the first indicator 66 as compared to the location of the second indicator 68.

Figure 5:
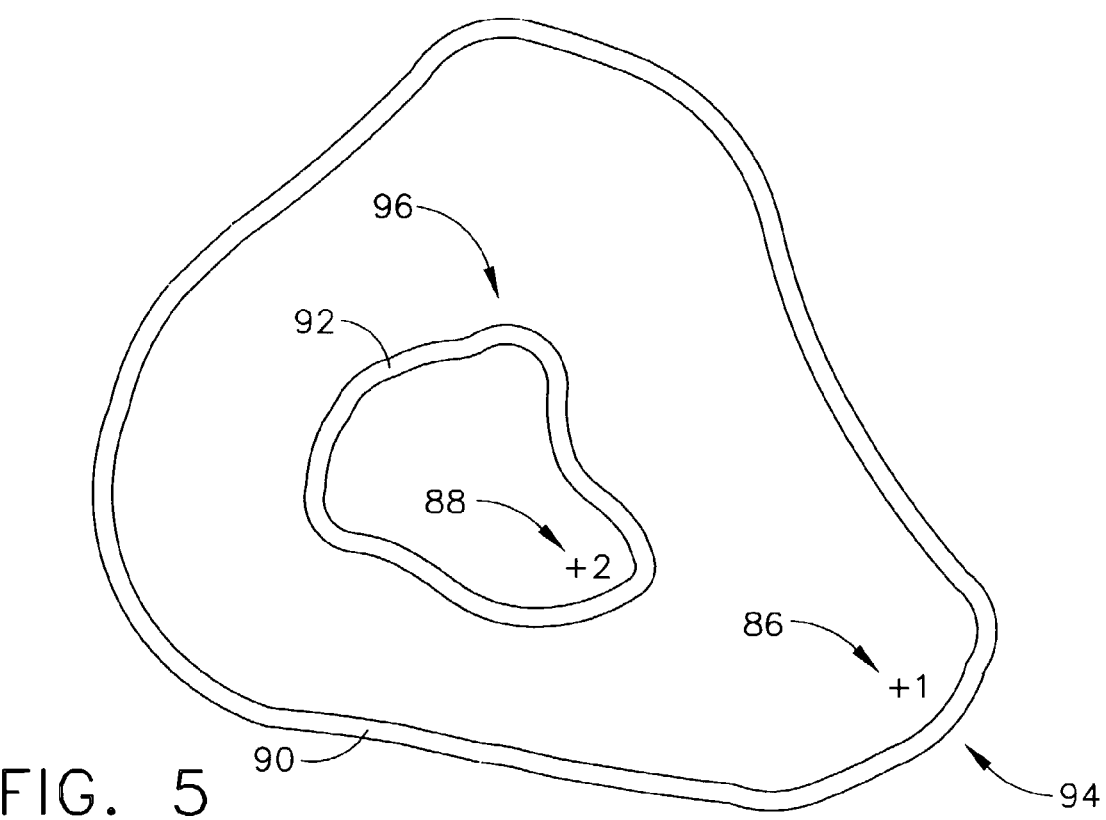
FIG. 5 is an enlarged view of the lines bordering at least portions of objects as described with reference to FIG. 2 having yet another characteristic according to an exemplary embodiment of the present invention.

Referring to FIG. 5, at least one indicator, and preferably multiple indicators (86,88) other than the arrow is provided as another characteristic for the lines (90,92) in order to distinguish between the objects (94,96) and also preferably assist with a determination of the relative difference between the objects. More specifically, numerical labels are provided for each of the lines (90,92). However, any number of numerical or alphanumerical labels can be utilized in accordance with the present invention. The indicators (86,88) formed as a numerical label in this example can be configured to provide information that indicates the relative difference between the objects (94,96) that at least a portion of which are bordered by the lines (90,92). For example, a first indicator 86 formed as a numerical label at the first line 90 having a first value and a second indicator 88 formed as a numerical label at the second line having a second value that is greater than the first value can indicate that the relative altitude rises from the first line 90 to the second line 92, and the magnitude of the difference can provide an indication of the rate that the altitude changes between the lines (90,92).

Each of these indicators and other indicators as previously described in this detailed description of the invention and other indicators not specifically described in this detailed description of the invention. In addition, these indicators can be utilized with any other the other schemes that are provided by the apparatus 20 for displaying data categories of FIG. 1, FIG. 2, FIG. 3, FIG. 4, and FIG. 5. Furthermore, these indicators can be utilized with any other schemes as subsequently described in methods for display data categories.

Figure 6:
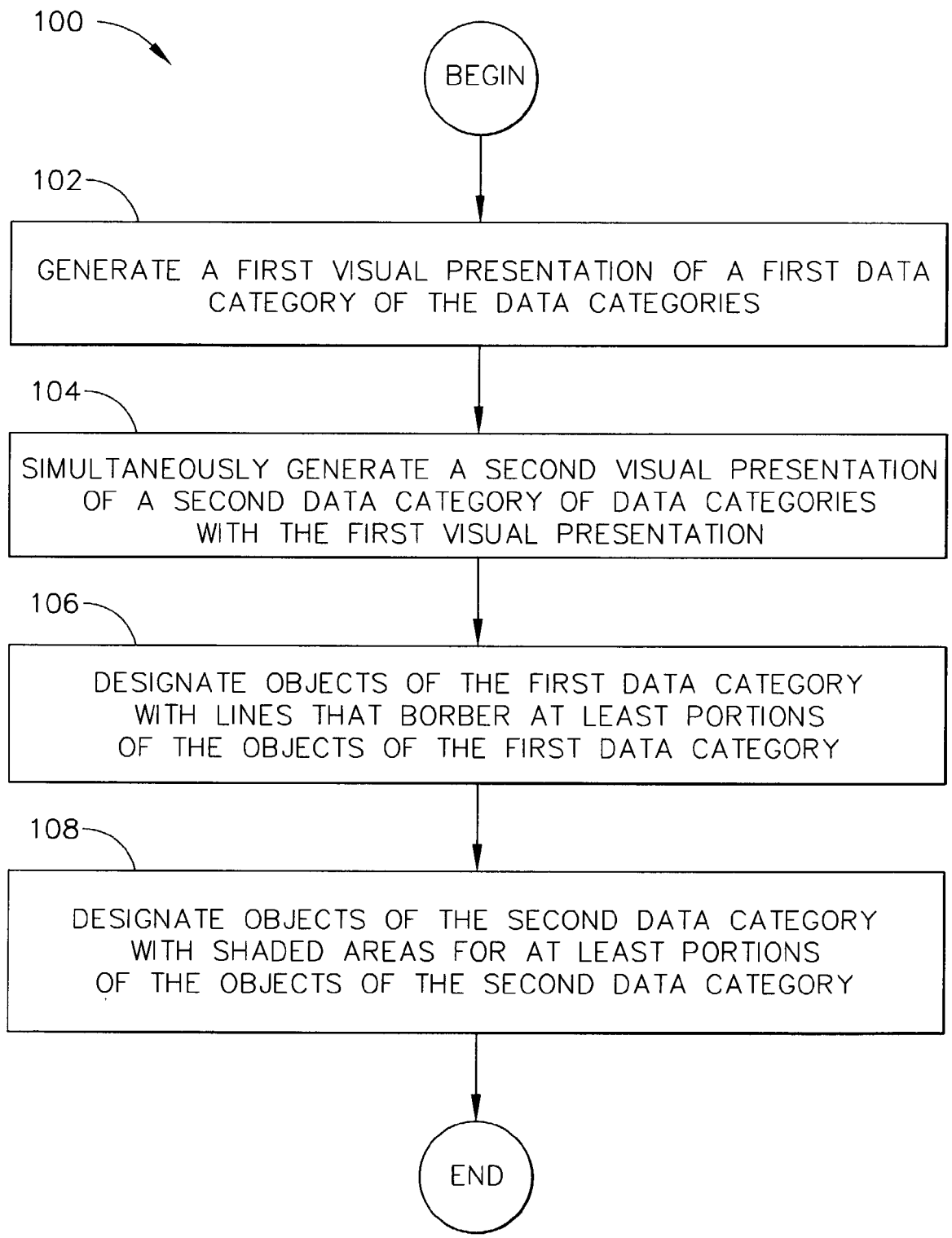
FIG. 6 is a flowchart illustrating a method for displaying data categories according to an exemplary embodiment of the present invention.

Referring to FIG. 6 a method 100 for displaying data categories is illustrated according to an exemplary embodiment of the present invention. Additional details of the method 100 can be found as previously described in this detailed description of the invention. Furthermore, one or more of the steps subsequently described are optional, and the following steps can be used with other steps not implicitly or explicitly provided in FIG. 6.

The method 100 for displaying data categories comprises generating a first visual presentation of a first data category of the data categories 102 and simultaneously generating a second visual presentation of a second data category of the data categories with the first visual presentation 104. In addition, the method 100 comprises designating objects of the first data category with lines that border at least portions of the objects 106. Furthermore, the method 100 comprises designating objects of the second data category with shaded areas for at least a portion of objects of the second data category 108.

From the foregoing description, it should be appreciated that methods and apparatus are provided for displaying multiple data categories that present significant benefits that have been presented in the background of the invention and detailed description of a preferred exemplary embodiment, and also present significant benefits that would be apparent to one or ordinary skill in the art. Furthermore, while preferred exemplary embodiments have been presented in the foregoing description of a preferred exemplary embodiment, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in the exemplary preferred embodiment without departing from the spirit and scope of the invention as set forth in the appended claims.

What is claimed is:

1. An apparatus for displaying a plurality of data categories, comprising:
    a display that is configured to produce a first visual presentation of a first data category of the plurality of data categories and a second visual presentation of said second data category of the plurality of data categories, said first and second data categories comprising data selected from the group consisting of aircraft sensor data and aircraft navigation data; and
    a processor that is configured to control said display during simultaneous production of said first visual presentation and said second visual presentation, wherein said processor is configured to control said display such that a first and a second object of said first data category are displayed thereon, said first object comprising an area defined by at least a portion of a first line having a first thickness, and said second data object comprising an area defined by at least a portion of a second line having a second thickness, wherein said first thickness is greater than said second thickness.

2. The apparatus for displaying the plurality of data categories of claim 1, wherein said processor is configured to control said display such that said first visual presentation comprises a third object of said first data category comprising an area defined by at least a portion of a third line.

3. The apparatus for displaying the plurality of data categories of claim 1, wherein said processor is configured to control said display such that said first line is a first color.

4. The apparatus for displaying the plurality of data categories of claim 1, wherein said processor is configured to control said display such that said first line is a first color and said second line is a second color other than said first color.

5. The apparatus for displaying the plurality of data categories of claim 2, wherein said processor is configured to control said display such that said first line is a first color, said second line is a second color other than said first color, and said third line is a third color other than said first color and said second color.

6. The apparatus for displaying the plurality of data categories of claim 2, wherein said processor is configured to control said display such that said third line has a third thickness greater than said first thickness and said second thickness.

7. The apparatus for displaying the plurality of data categories of claim 1, wherein said processor is configured to control said display such that an indicator is provided for indicating a relative difference between said first line and said second line.

8. The apparatus for displaying the plurality of data categories of claim 7, wherein said indicator is an arrow extending substantially from said first line to said second line.

9. The apparatus for displaying the plurality of data categories of claim 1, wherein said processor is configured to control said display such that said second visual presentation comprises a third shaded area for at least a portion of a third object of said second data category.

10. The apparatus for displaying the plurality of data categories of claim 1, wherein said processor is configured to control said display such that said second visual presentation comprises a first shaded area for at least a portion of a first object of said second data category.

11. The apparatus for displaying the plurality of data categories of claim 10, wherein said processor is configured to control said display such that said second visual presentation comprises a second shaded area for at least a portion of a second object of said second data category.

12. A method for displaying a plurality of data categories, comprising:
    generating a first visual presentation of a first data category of the plurality of data categories, said first data category comprising data selected from the group consisting of aircraft sensor data and aircraft navigation data;
    simultaneously generating a second visual presentation of a second data category of the plurality of data categories with said first visual presentation of said first data category, said second data category comprising data selected from the group consisting of aircraft sensor data and aircraft navigation data; and
    designating in said first visual presentation a first and a second object of said first data category, said first object comprising an area defined by at least a portion of a first line having a first thickness, and said second object comprising an area defined by at least a portion of a second line having a second thickness, wherein said first thickness is greater than said second thickness.

13. The method for displaying the plurality of data categories of claim 12, further comprising designating in said first visual presentation a third object of said first data category comprising an area defined by at least a portion of a third line.

14. The method for displaying the plurality of data categories of claim 12, wherein said first line has a first color.

15. The method for displaying the plurality of data categories of claim 12, wherein said first line has a first color and said second line has a second color other than said first color.

16. The method for displaying the plurality of data categories of claim 13, wherein said first line has a first color, said second line has a second color other than said first color, and said third line has a third color other than said first color and said second color.

17. The method for displaying the plurality of data categories of claim 13, wherein said third line has a third thickness greater than said first thickness and said second thickness.

18. The method for displaying the plurality of data categories of claim 12, further comprising providing an indicator that presents a relative difference between said first line and said second line.

19. The method for displaying the plurality of data categories of claim 18 wherein said indicator is an arrow extending substantially from said first line to said second line.

* * * * *